June 18, 1957  M. D. QUIGLEY  2,796,235
PROCESS OF GEOPHYSICAL PROSPECTING
Filed May 24, 1952
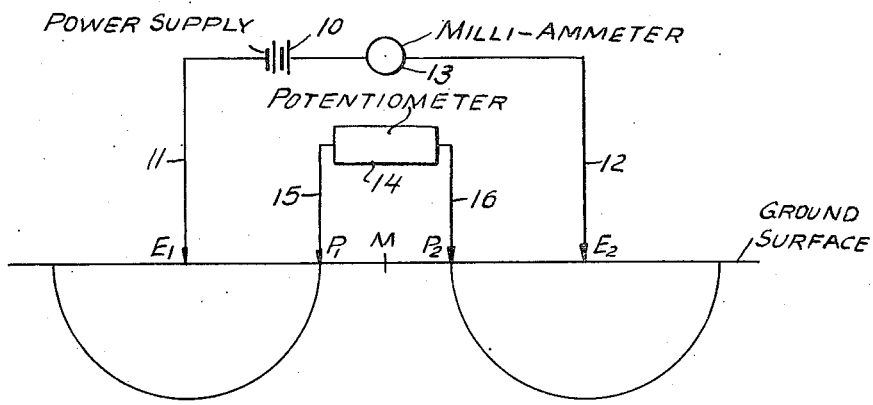
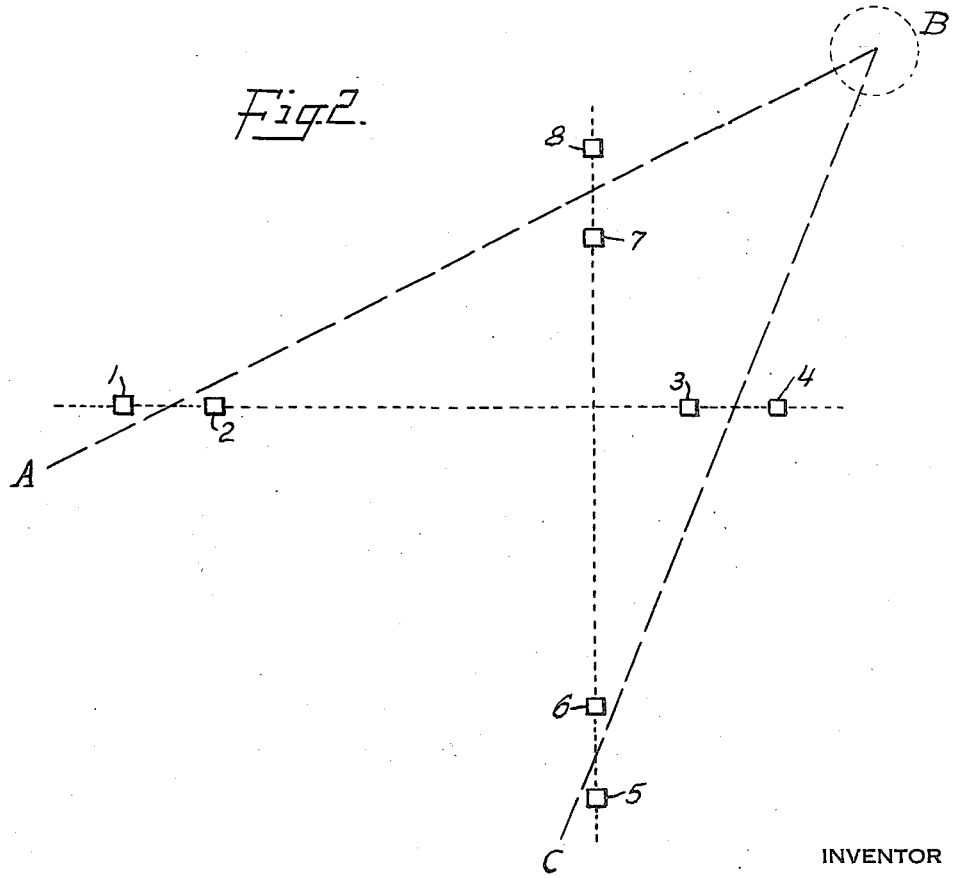
INVENTOR
MILNER D. QUIGLEY
BY
Adams, Forward and McLean
ATTORNEYS

2,796,235

PROCESS OF GEOPHYSICAL PROSPECTING

Milner D. Quigley, Salt Lake City, Utah, assignor to Sinclair Oil & Gas Company, a corporation of Maine Application May 24, 1952, Serial No. 289,891

2 Claims. (Cl. 255—1.8)

My invention relates to the application of electrical determinations of subsurface resistivity in a novel manner to oil exploration in faulted and fractured formations, particularly of a type occurring in the Uinta Basin.

Oil production in the Uinta Basin is primarily from fractures in the Green River massive shale beds which are not subject to correlation with geologic structures. Seismic gravity and magnetic methods therefore which depend upon detection of structure have proved unsatisfactory in locating oil reservoirs of the highly fractured type to be found in the Green River shale. I have noted that a major geological feature of the Uinta Basin region is the widespread occurrence of bitumen filled fissures or gilsonite dikes at outcrops which apparently extend for considerable distance laterally and vertically in the shale beds. I have concluded from my studies that the gilsonite dikes are indicators of highly fractured areas from which they originate and which may be oil reservoirs. My invention is based in part upon location of the gilsonite dikes and their employment as indicator guides to promising locations for drilling oil wells. The location of the gilsonite dikes moreover is valuable in itself since the gilsonite can be profitably mined.

The gilsonite dikes are characterized by relatively high electrical resistivity compared to the surrounding formations since, as solid hydrocarbons, they are non-conductors of electricity and thus the gilsonite dikes represent subsurface areas or planes of high resistance. By application of electrical prospecting methods, the occurrence of subsurface gilsonite dikes can be determined, the probable origin of the dikes can be located, and the approximate locality of origin can be drilled for oil with reasonable prospects of success.

Although electrical methods of geophyical exploration have been used in minerals prospecting, they have never been used extensively in exploration for oil. The chief reason for this is the ineffectiveness of electrical methods beyond shallow depths since electrical methods seldom give information on subsurface features deeper than about 1,000 feet. Although oil reservoirs requiring detection by geophysical methods occur at depths inaccessible to electrical prospecting methods, I have observed that the subsurface gilsonite dikes rise close to the surface and rarely are concealed by more than about 200 to 400 feet of quaternary overburden and can be located electrically. I have also observed that regions containing gilsonite filled fissures are concurrently regions of well developed fracture systems. (Any displacement of the adjacent walls of a fracture gives rise to faulting.) When buried, it is impossible to locate or survey these fracture systems and faults by conventional means. I have found that vertically extending fault planes are detectable electrically as planes of abnormally large resistivity gradients and provide potential guides from shallow levels of subsurface exploration to deep fractured areas of oil bearing interest. The displacement of the fracture walls places strata in juxtaposition which have different resistivities, making possible the detection of the faults by electrical methods.

According to my invention, electrical determination of subsurface abnormalities in resistance or resistivity are made at a plurality of points along a plurality of traverses over sufficient surface area to map profiles or contours of resistivity (or conversely current flow) versus distance from which subsurface, laterally and vertically extending areas of abnormally high resistivity compared to the apparent resistivity of the surrounding subsurface formation can be identified. The determinations depend upon determination of variations in subsurface current flow from one recording point to another whereby abnormalities in apparent subsurface resistivity can be estimated or calculated. In oil exploration, the process is completed by drilling a well to the stratum of possible oil content in the approximate locality of a concealed fracture reservoir, advantageously determined as the area of intersection of two or more subsurface planes of high resistivity. Thus according to my invention, the occurrence of concealed gilsonite dikes may be located from the surface by resistivity determination and the subsurface profiles may be mapped by contouring data obtained by conducting a plurality of traversing or bracketing electrical surveys over the area of probable underground occurrence with which the origin of the hydrocarbon filling the fractures may be identified. Similarly the occurrence of concealed faults may be located from the surface, and, by a plurality of traversing electrical surveys mapping the spatial direction of the subsurface fault planes, they may be utilized as subsurface guides to deep fractures located in strata of oil bearing interest.

In the practice of my invention, several methods of resistivity determination may be employed. For example, determination of apparent resistivity at a particular point may be made by means of two pairs of electrodes. One pair of electrodes applies current from an external source of electromotive potential to the overburden, and the second pair of electrodes, at a predetermined distance from the first pair of electrodes, is employed to determine and record the potential drop. Usually the electrodes are set up in alignment, advantageously according to the Wenner arrangement (see for example "Introduction to Geophysical Prospecting," Dobrin, McGraw-Hill, 1952, pages 295–298), whereby the pair of potential electrodes is aligned within the pair of current electrodes and each potential electrode is separated from the nearer current electrode by ⅓ of the distance between the current electrodes. The midpoint of the electrode spread then is the point taken as the geographic datum point for plotting the resistivity and the system of electrodes is moved with constant separation successively along the selected profile in order to plot the resistivities at a plurality of spaced points.

The source of electric power needed for application of the external current may be moderate in potential level; e. g. 200 volts, and an ordinary recording potentiometer may be employed to record data. The electrodes are advantageously embedded several feet in the overburden and non-polarizing electrodes such as copper-copper sulfate porous pots or a low frequency alternating current may be employed to eliminate polarization effects at the electrodes. In the plot of resistivity against distance along the selected profile, the location of subsurface gilsonite dikes or fault planes will appear as areas or planes of abnormally high resistivity. By selecting and conducting a plurality of traversing surface profiles, the number of which will depend upon the location of known subsurface structural barriers and landmarks, the direction of the subsurface gilsonite dikes or faults can be plotted. If the terrain or apparent direction of the subsurface dikes or faults makes it desirable, the traverses may be supplemented by bracketing determinations along suspected lines of high resistivity. The areas of subsurface existance of gilsonite dikes present favorable prospects for well location by drilling.

Other electrical methods of resistivity determination can be employed. For example, a number of different systems employing varying equipment, electrode configurations and methods of recording data have been described in the literature. In addition, although with lesser clarity of resolution, the natural earth currents, or telluric currents, flowing through the earth subsurface can be utilized to determine abnormalities in resistivity indirectly by comparing the potential gradient along traverses established between electrode pairs at a fixed station and at mobile stations. The telluric field is mapped over the area, and profiles of abnormally high resistivity can be contoured by observing the direction and intensity of the subsurface current flow as it tends to flow over and past the dikes of high resistivity. For this method of applying my invention, reference is made to Boissonas and Leonardon, "Geophysical exploration by telluric currents," Geophysics, vol. 13, No. 3 page 389, July 1948. Usually two pairs of electrodes, perpendicularly aligned, are employed for each station, advantageously with high speed recorders to record oscillations in the earth current potentials.

My invention has the important advantage of providing relatively inexpensive and quick exploration means for selecting a drilling site having good prospects of developing production. Its special advantage is best obtained in regions where reservoirs are associated with faulting and fracturing rather than where they are associated with folding that can be determined by surface geology or other geophysical means. Thus it has special advantage in application to a region such as the Uinta Basin where gilsonite dikes and faults characteristic of subsurface fracturing occur widely. By way of example, the principles applicable in my invention were tested in a series of test surveys with a low power Gish-Rooney electrical resistivity unit. Gilsonite dikes were located with good resolution of depths of 50 to 510 feet by measuring resistivity of the formation in ohm-centimeters at the center of the resistivity stakes at regular intervals along traverses of about 500 to 1000 feet. Also in a test survey of a canyon floor, a fault (visible in the canyon walls) was successfully located at about 150 feet depth below the surface of the canyon floor.

Means for making the resistivity determinations in the practice of my invention, together with an illustrative plot made from data determined by such determinations in practice of my invention, are shown by way of example in the accompanying drawings wherein:

Fig. 1 is a diagram of the resistivity means and

Fig. 2 is a simplified diagrammatic sketch plotting the direction and intersection of two hydrocarbon-lined discontinuities indicating the area for drilling a test well.

In the system for determining subsurface apparent resistivity illustrated in Fig. 1, two current electrodes designated $E_1$ and $E_2$ are disposed along the traverse line to be profiled. Two potential electrodes designated $P_1$ and $P_2$ are disposed equidistant between the current electrodes and in alignment. Thus each potential electrode is separated from its neighboring current electrode by one third of the current electrode spacing. The midpoint, M, is taken as the point of apparent resistivity determination. The current electrodes $E_1$ and $E_2$ are driven into the earth surface and are connected by the circuit comprising power supply 10, milli-ammeter 13 and wiring 11 and 12. The potential electrodes $P_1$ and $P_2$ are also inserted in the earth surface and are connected by a circuit comprising potentiometer 14 and wiring 15 and 16. In the Gish-Rooney type apparatus employed, the current electrodes are battery powered and designed for a maximum output of about 500 volts. A motor driven or manually cranked double commutator alternates the out-going current and rectifies the alternating potential across the inner electrodes. Current is measured by milli-ammeter 13 and the potential difference between electrodes $P_1$ and $P_2$ is measured by potentiometer 14. The synchronous commutator produces a circuit not affected by natural earth currents and minimizes the effects of large potential differences such as are caused by polarization at the electrodes.

By means of the above-illustrated equipment, the apparent resistivity is measured at a plurality of spaced points along a plurality traversing surface profiles by plotting the apparent resistivities against distance along a given profile. By noting and contouring or correlating points of abnormally high resistivity compared to the normal order of apparent resistivity for the subsurface formation, hydrocarbon separated discontinuities such as fault planes, fissures or dikes may be identified and their lateral and vertical direction may be mapped. For example, as shown in Fig. 2 in simplified form, the pairs of points 1 and 2 and 3 and 4, respectively, delineate regions of abnormally high resistivity along the east-west profile indicated by the dotted line. Similarly, the pairs of points 5 and 6 and 7 and 8, respectively, delineate regions of abnormally high resistivity determined along the north-south profile indicated by the dotted line. Now, by constructing lines A—B and C—D through the pairs of points most consistent with all of the available data, the direction of suspected subsurface gilsonite dikes is followed to the intersection point ringed by the dotted circle which then provides an indication of a fractured structure. A test oil well then can be drilled with reasonable prospects of success, since the area appears to be the origin of the gilsonite or hydrocarbon-containing dikes.

I claim:

1. In geophysical prospecting by electrical methods, the method of applying electrical determinations to oil exploration which comprises determining the apparent resistivity of subsurface strata at a plurality of spaced points along a plurality of traversing surface profiles, locating the presence and spatial disposition of intersecting formations of possible oil content indicated by abnormally high resistivity, and drilling a well to a stratum of possible oil content in the approximate locality, of said intersection of said subsurface formations.

2. In geophysical prospecting by electrical methods, the method of applying electrical determinations to oil exploration in faulted and fractured formations characterized by the presence of subsurface discontinuities such as faults and bitumen or hydrocarbon fissures extending upwardly and outwardly from a highly fractured area which comprises determining the apparent resistivity of the subsurface structure at a plurality of spaced points along a plurality of traversing surface profiles by determination of variations in subsurface current flow, locating the lateral and vertical directions of passage of at least two subsurface discontinuities as laterally and vertically extending areas of abnormally high resistivity in the subsurface strata, fixing the approximate locality of intersection of the subsurface discontinuities by means of their previously located directions, and drilling a well to a stratum of possible oil content in the approximate locality of said intersection of said subsurface discontinuities.

References Cited in the file of this patent

UNITED STATES PATENTS

| | | |
|---|---|---|
| 2,231,048 | Beacham | Feb. 11, 1941 |
| 2,234,956 | Bilinsky | Mar. 18, 1941 |
| 2,256,742 | Jakosky | Sept. 23, 1941 |
| 2,277,707 | Lee | Mar. 31, 1942 |
| 2,293,024 | Klipsch | Aug. 11, 1942 |
| 2,314,873 | Evjen | Mar. 30, 1943 |
| 2,345,608 | Lee | Apr. 4, 1944 |
| 2,375,775 | Evjen | May 15, 1945 |

OTHER REFERENCES

"Exploration Geophysics," by Jakosky, 1950, second edition, fourth impression; published by Trija Pub. Co., Gayley Avenue, Los Angeles, California; pp 444–450, 467, 489–491, 507–513, 516–521, 537–538.